United States Patent
Shepherd et al.

(10) Patent No.: US 6,560,643 B1
(45) Date of Patent: *May 6, 2003

(54) SYSTEM OF SELF-SERVICE TERMINALS AND METHOD OF DISTRIBUTING SOFTWARE TO A PLURALITY OF SELF-SERVICE TERMINALS

(75) Inventors: Bruce Shepherd, Angus (GB); Robert P. McPherson, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,251

(22) Filed: Mar. 16, 2000

Related U.S. Application Data

(63) Continuation of application No. 08/857,670, filed on May 19, 1997, now Pat. No. 6,052,721, which is a continuation of application No. 08/409,393, filed on Mar. 24, 1995, now abandoned.

(30) Foreign Application Priority Data

Jun. 22, 1994 (GB) ............................................. 9412553

(51) Int. Cl.$^7$ ............................................. G06F 15/177
(52) U.S. Cl. ..................... 709/220; 709/221; 709/222; 370/255; 370/390; 370/408
(58) Field of Search ................................. 709/220–222; 714/748; 370/255, 388, 390, 400, 408

(56) References Cited

U.S. PATENT DOCUMENTS

| | | | | |
|---|---|---|---|---|
| 4,740,954 A | * | 4/1988 | Cotton et al. | 370/408 |
| 4,802,218 A | | 1/1989 | Wright et al. | |
| 4,866,668 A | | 9/1989 | Edmonds et al. | |
| 5,103,444 A | | 4/1992 | Leung et al. | |
| 5,109,384 A | * | 4/1992 | Tseung | 714/748 |
| 5,341,372 A | * | 8/1994 | Kirkham | 370/400 |
| 5,355,371 A | * | 10/1994 | Auerbach et al. | 370/255 |
| 5,457,808 A | * | 10/1995 | Osawa et al. | 455/8 |
| 5,459,725 A | * | 10/1995 | Bodner et al. | 370/390 |
| 5,495,610 A | | 2/1996 | Shing et al. | |
| 5,561,807 A | | 10/1996 | Verplanken et al. | |
| 5,671,222 A | * | 9/1997 | Chen et al. | 370/388 |
| 6,052,721 A | * | 4/2000 | Shepherd et al. | 709/221 |

FOREIGN PATENT DOCUMENTS

| | | |
|---|---|---|
| EP | 0 504 860 A2 | 9/1992 |
| EP | 0 519 071 A1 | 12/1992 |

* cited by examiner

*Primary Examiner*—Nabil El-Hady
(74) *Attorney, Agent, or Firm*—Michael Chan

(57) ABSTRACT

In a software management system, a software package held in a management station (12) is transferred across a communications network (14) to a plurality of destination terminals (16), of which there may be a large number. In order to save on distribution time, the management station (12) can cause terminals (16) which have received the software package to transmit it to further terminals, until all terminals (16) have received the package.

1 Claim, 6 Drawing Sheets

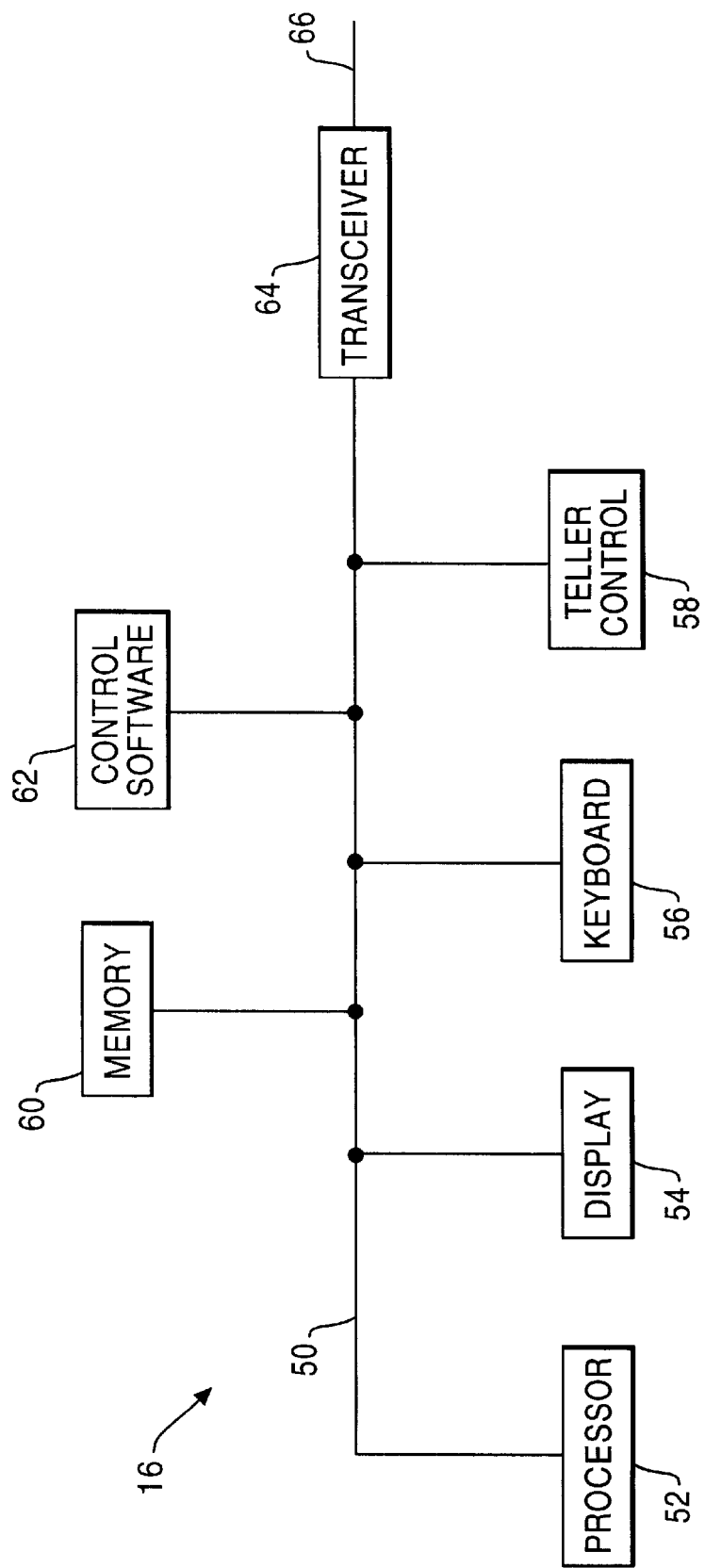

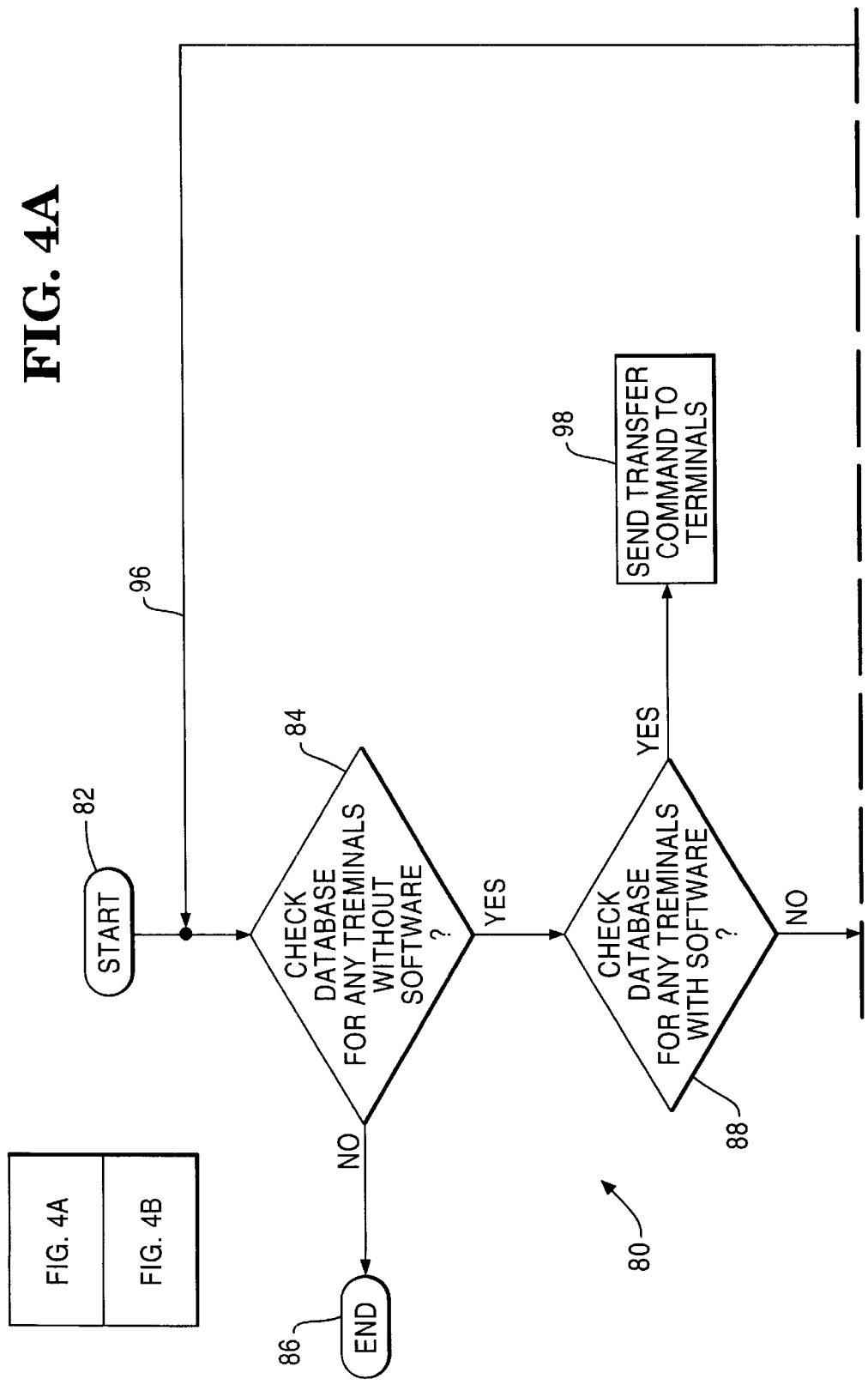

SYSTEM OF SELF-SERVICE TERMINALS AND METHOD OF DISTRIBUTING SOFTWARE TO A PLURALITY OF SELF-SERVICE TERMINALS

This is a continuation of application Ser. No. 08/857,670 filed on May 19, 1997, now U.S. Pat. No. 6,052,721, issued on Apr. 18, 2000, which is a continuation of application Ser. No. 08/409,393 filed on Mar. 24, 1995, now abandoned.

BACKGROUND OF THE INVENTION

This invention relates to a method and apparatus for distributing software.

The invention has a particular application to the distribution of a software package to a plurality of terminals.

One example of a system wherein a plurality of terminals are connected to a management station is where the terminals are self-service terminals (SSTs) such as automated teller machines (ATMs). The terminals may be located at widely separated geographical locations, and are interconnected by a communications network such as a public data network, for example a network conforming to the CCITT X.25 standard. The transfer of signals over long distances via such a network may be via low speed lines and hence lengthy times may be involved in such transfer. With such a network of terminals, it is sometimes desirable that a common software package should be distributed to all the terminals in the network. Such software package may, for example, modify the manner in which the terminals operate and it is desirable that all the terminals should receive the common software package without undue delays.

SUMMARY OF THE INVENTION

According to one aspect of the present invention, there is provided a method of distributing a software package from a source station to a plurality of terminals, characterized by the steps of: transmitting said software package from said source station to at least one of said terminals; and utilizing at least one of said terminals which has received said software package to transmit said software package to another of said terminals.

According to another aspect of the present invention, there is provided a terminal system including a management station, a plurality of terminals and connection means adapted to interconnect said management station and said terminals, characterized in that said management station is adapted to transmit a software package to at least one of said terminals, and in that said management station is adapted to cause a terminal which has received said software package to transmit said software package to another of said terminals.

It will be appreciated that a method and apparatus according to the invention enable a significant saving in distribution time to be achieved by utilizing terminals which have received the software package to distribute the software package to other terminals.

It is therefore an object of the present invention to provide a method and apparatus whereby software may be distributed to a plurality of terminals at high speed.

BRIEF DESCRIPTION OF THE DRAWINGS

One embodiment of the present invention will now be described by way of example, with reference to the accompanying drawings, in which:

FIG. 3 is a simplified block diagram of one of the terminals shown in FIG. 1;

FIGS. 4A and 4B, assembled as shown in FIG. 4, are a flowchart illustrating the operation of the management station during a software distribution operation.

DETAILED DESCRIPTION

Figure 1:
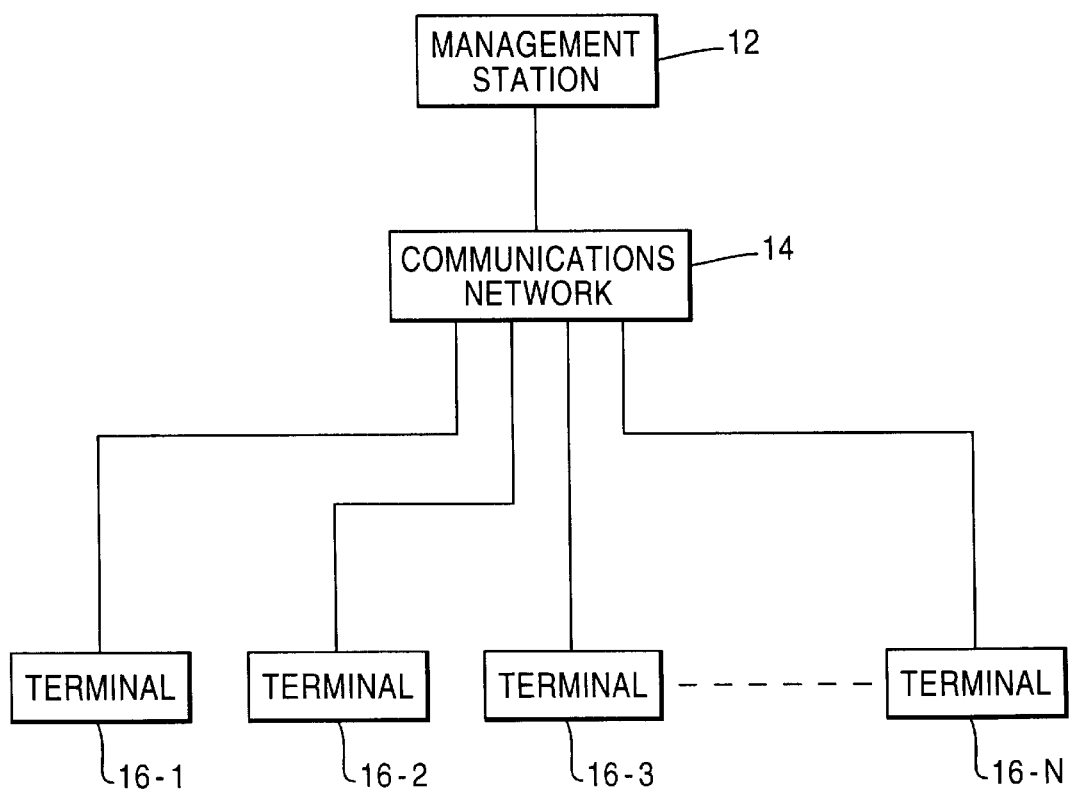
FIG. 1 is a block diagram of a terminal system including a management station and a plurality of terminals.

Referring first to FIG. 1, there is shown a terminal system 10 including a management station 12 connected over a communications network 14 to a plurality of terminals 16, referenced individually as terminals 16-1, 16-2, 16-3 up to 16-N. In the preferred embodiment, the terminals 16 are SSTs (self-service terminals) such as ATMs (automated teller machines), adapted for operation by members of the public. Also in the preferred embodiment, the communications network 14 is a public data network to which the management station 12 and the terminals 16 are connected. The management station 12 may be a computer such as a personal computer (PC).

The management station 12 and terminals 16 transfer information in packet mode; that is, information is transferred by means of packets which pass through the communications network 14 via interfaces conforming to the CCITT X.25 standard, for example. However, other types of communications network may be utilized. It should be understood that the system 10 is a peer-to-peer system, that is, any of the terminals 16 can communicate directly with any other terminal 16, as well as with the management station 12. The number of terminals 16 in the system 10 may be quite large, for example there may be several hundred, or over one thousand terminals 16 in the system 10.

Figure 2:
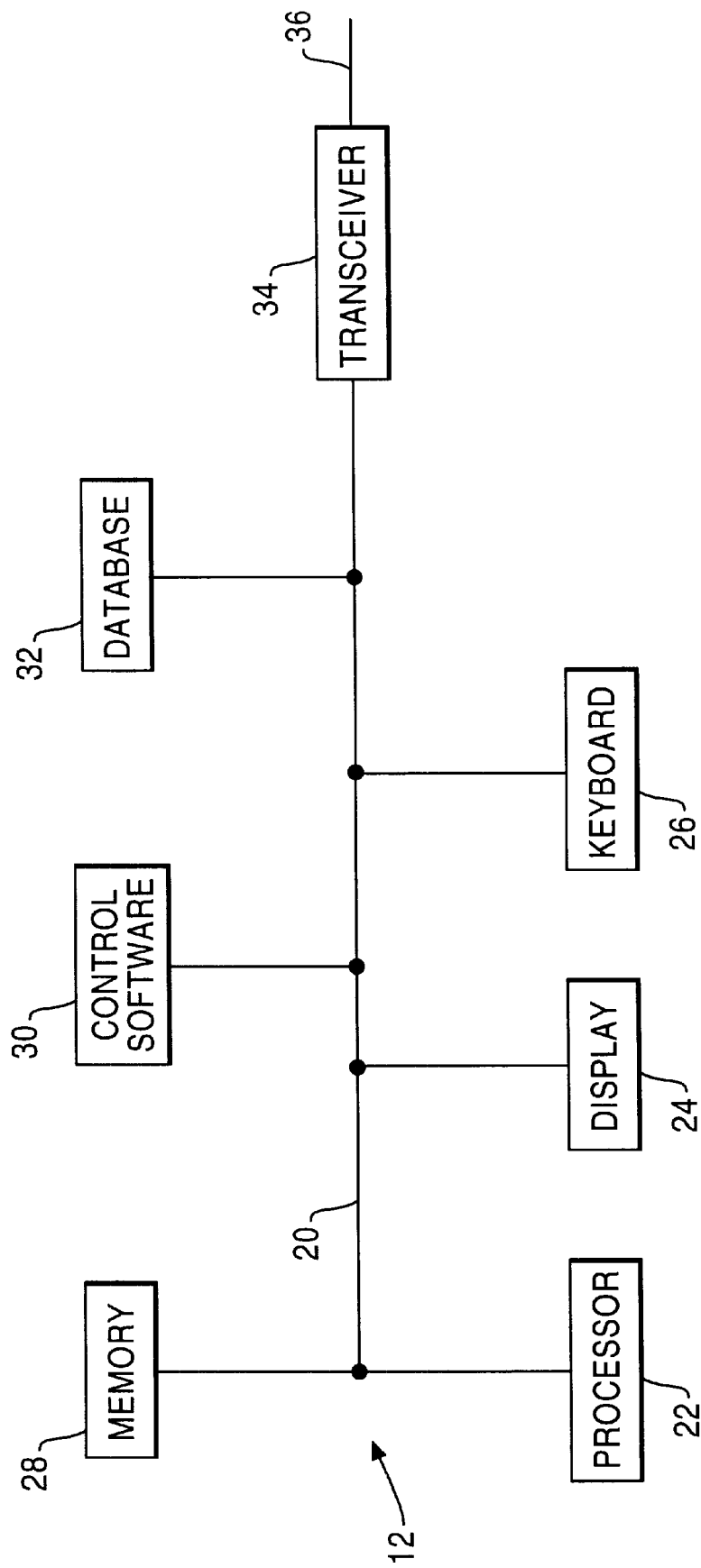
FIG. 2 is a simplified block diagram of the management station shown in FIG. 1.

Referring now to FIG. 2, there is shown a simplified block diagram of the management station 12. The management station 12 includes a bus 20 to which are connected a processor 22, a display 24, a keyboard 26 and a memory device 28. Also connected to the bus 20 are a control software storage unit 30, which may be a part of the memory 28, and a database unit 32, the function of which will be described hereinafter. The bus 20 is also connected to a transceiver 34 which communicates with the communications network 14 over a channel 36.

Referring now to FIG. 3, there is shown a simplified block diagram of a terminal 16. The terminal 16 includes a bus 50 to which are connected a processor 52, a display 54, a keyboard 56 and a teller control unit 58 which controls the teller functions of the terminal 16, such as cash dispensing, cash receiving, document receiving and processing and the like. Also connected to the bus 50 are a memory 60 and a control software store 62, which may be physically part of the memory 60. The bus 50 is also connected to a transceiver 64 which communicates with the communications network 14 over a channel 66.

The present invention is concerned with the distribution of a common software package from the management station 12 to the terminals 16. In this connection it will be appreciated that it is desirable that such distribution should be effected with minimum delay, having regard to the delays inherent in the communications network 14, which may cover a wide geographical area, and the possibly large number of terminals 16 destined to receive the common software package.

The operation of the management station 12 during a software distribution procedure will now be described. It should first be understood that the database 32 (FIG. 2) stores a list of all the terminals 16 together with an indication of whether or not they have received the software package to be distributed. It should also be understood that the software package is initially stored in the memory 28 and is transmitted in conventional manner as a series of packets via the transceiver 34 over the communications network 14. Preferably, the management station 12 has the capability of transmitting simultaneously to a plurality of the terminals 16.

Figure 4B:
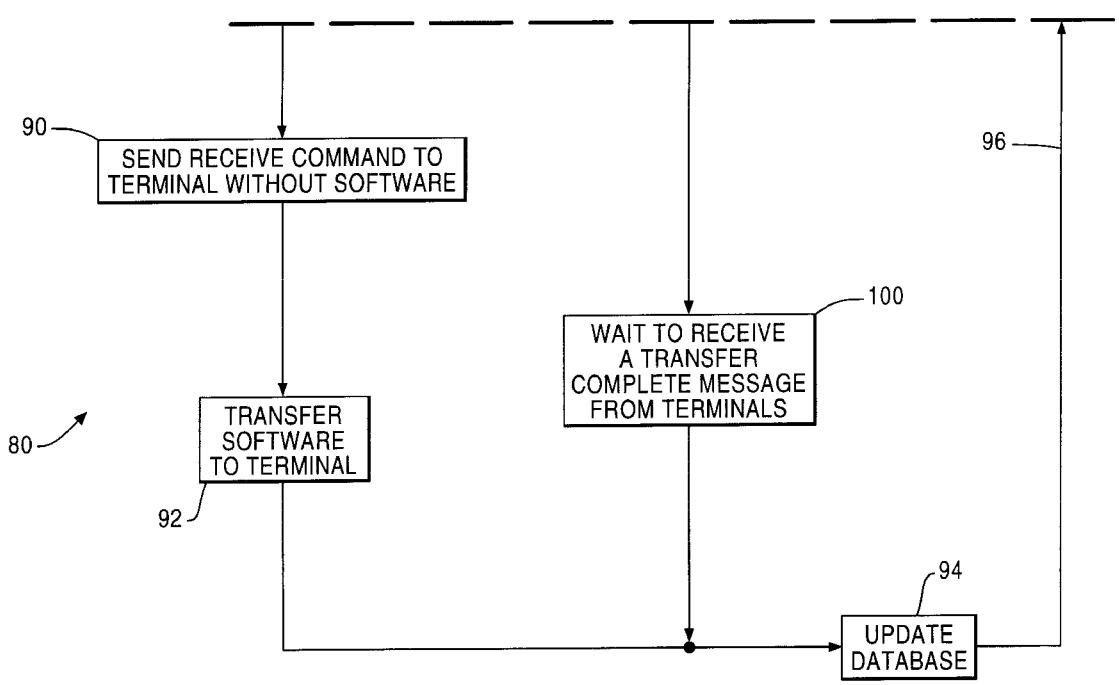

Referring now to FIGS. 4A and 4B, there is shown a flowchart 80 illustrating the operation of the management station 12 during a software distribution procedure. The procedure begins at the start block 82 and proceeds to block 84 where the database 32 (FIG. 2) is checked to determine whether any terminals 16 listed are without the software package. If no terminals are listed as being without the software package, the procedure terminates (block 86). If there are terminals listed as being without the software, the flowchart proceeds to block 88, where the database 32 (FIG. 2) is checked to ascertain whether any terminals are listed as having received the software package. If no, the flowchart proceeds to block 90 and a RECEIVE command is sent to a terminal 16 which does not have the software. It should be noted at this point that if the management station 12 has the necessary capability, then the RECEIVE command may be sent simultaneously to a plurality of the terminals 16. The RECEIVE command has the format p1 RECV (Filename) where "Filename" identifies the software package to be distributed. The RECEIVE command conditions the terminal or terminals which receive it to receive the software package identified by its Filename. Next, (block 92) a SEND command effective in the management station 12, having the format SEND (Filename)

causes the designated software package to be sent to the terminal (or terminals) which received the RECEIVE command. Next, the database 32 is updated to record the terminal or terminals which have just received the software package, and the flowchart returns over the line 96 to block 84.

If at block 88 it is found that there are terminals listed in the database 32 as having received the software package, then the flowchart proceeds to block 98, and a TRANSFER command is sent to one or more of the terminals 16. The TRANSFER command has the format XFR (Filename, Destination)

where "Filename" identifies the software package and "Destination" identifies a terminal which is to receive the software package from a terminal which has received the TRANSFER command.

It should be understood that in block 98, a TRANSFER command may be sent concurrently to a plurality of terminals 16 dependent on the capability of the management station 12. Also, of course, the TRANSFER command will only be sent to as many terminals having the software package as are needed in accordance with the number of terminals which have not yet received the software package.

The flowchart then proceeds to block 100 where it is seen that the management station 12 waits until it has received TRANSFER COMPLETE messages from the terminals having the software package which were designated to send the software package to other terminals. When this operation is completed the flowchart proceeds to block 94 where the database 32 is updated by marking the terminals which have now received the software, whereafter the flowchart returns to block 84 as shown by the line 96.

Figure 5:
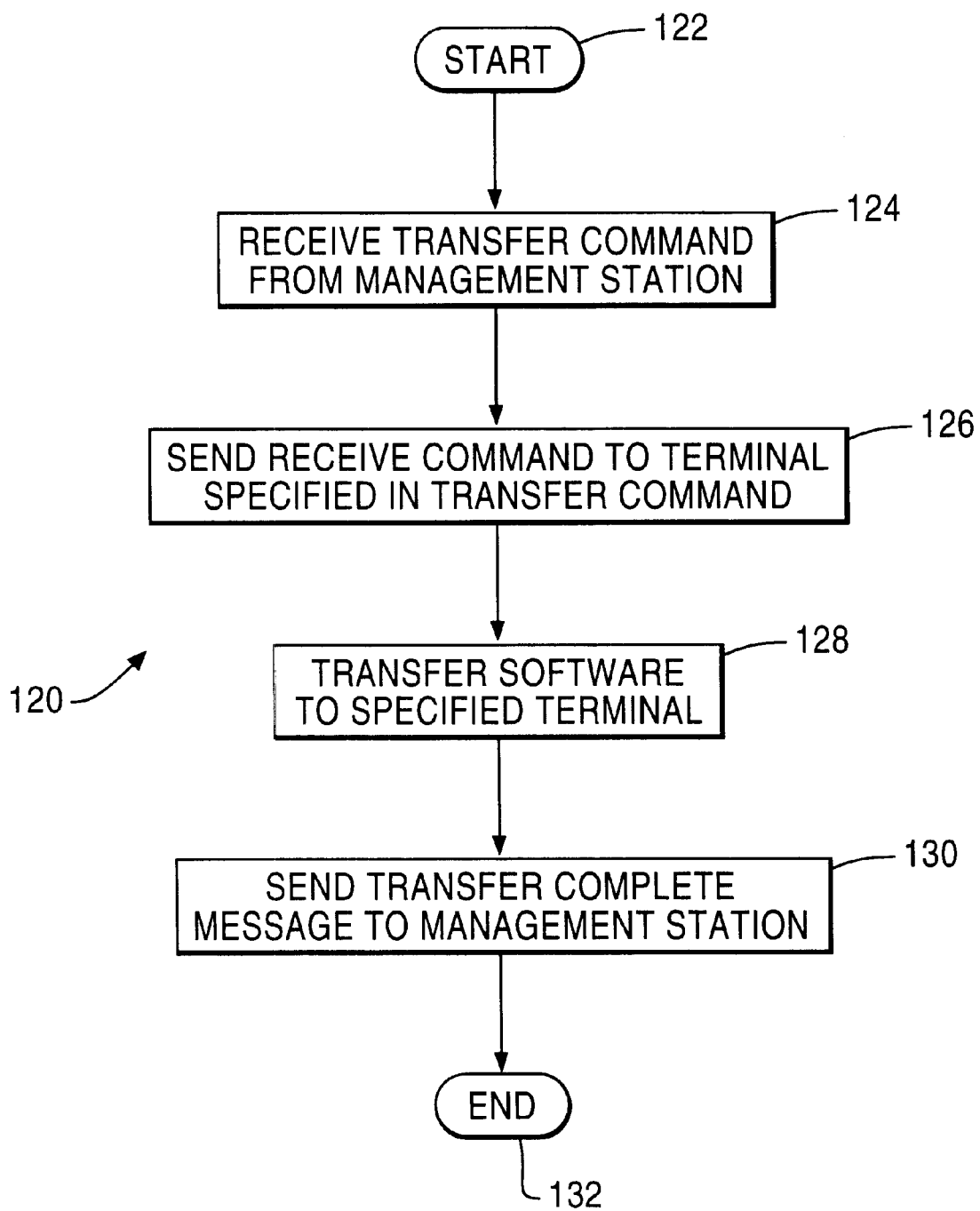
FIG. 5 is a flowchart illustrating the operation of a terminal during a software distribution operation.

Referring now to FIG. 5, there is shown a flowchart 120 of the operation of one of the terminals 16 which is to receive a TRANSFER command from the management station 12. Such a terminal 16 can be regarded as an agent of the management station 12 for the transmission of the software package to another one of the terminals 16. The flowchart 120 commences at start block 122 and proceeds to block 124 where it is seen that the terminal receives a TRANSFER command (discussed hereinabove) from the management station 12. Next, as shown by block 126, a RECEIVE command is sent to the terminal specified in the TRANSFER command which is to receive the software package. The software package is then transferred by the agent terminal to the specified terminal (block 128). The agent terminal then sends a TRANSFER COMPLETE message to the management station 12 to advise the management station that the software package has been transmitted to the specified terminal (block 130). This terminates the agent terminal's software package transfer operation as shown at block 132.

It will be appreciated that the use of the procedure described hereinabove, wherein terminals which have received the software packages can be controlled to further distribute the software package to other terminals, enables a considerable reduction in the overall time for distributing the software package to other terminals as compared with a procedure wherein the management station itself sends the software package directly to all the terminals.

For example, assume that the management station can perform ten concurrent transmissions, and has to distribute a software package to 1000 terminals ($T_0$ to $T_{999}$). Assume also that the transmission time for one software package is one hour. Using the described procedure, the management station 12 will send the software package to the terminals $T_0$ to $T_9$ during the first hour. At the start of the second hour the management station will command terminals $T_0$ to $T_9$ to distribute to terminals $T_{10}$ to $T_{19}$ respectively. During the second hour terminals $T_{10}$ to $T_{19}$ will receive the software package from their peer terminals $T_0$ to $T_9$. During this time the management station 12 is free to distribute the software to another ten terminals ($T_{20}$ to $T_{29}$). At the end of the second hour a total of 30 terminals ($T_0$ to $T_{29}$) will have received the software.

At the start of the third hour the management station 12 will command the terminals that have received the software ($T_0$ to $T_{29}$) to distribute to terminals $T_{30}$ to $T_{59}$ respectively. During the third hour terminals $T_{30}$ to $T_{59}$ will receive the software package from their peer terminals $T_0$ to $T_{29}$. During this time the management station is free to distribute the software to another ten terminals $T_{60}$ to $T_{69}$. At the end of the third hour a total of 70 terminals ($T_0$ to $T_{69}$) will have received the software. The process is repeated at the end of every hour. This results in the number of terminals receiving the software being doubled every hour (i.e. 10, 20, 40, 80, 160, . . . etc.) Using this method it will take only seven hours to distribute to 1000 terminals, as compared with the 100 hours it would take for the management station 12 to distribute the software packages directly to the terminals, ten at a time (since 1000/10=100).

While the form of the invention shown and described herein is admirably adapted to fulfill the object primarily stated, it is to be understood that it is not intended to confine the invention to the form or embodiment disclosed herein, for it is susceptible of embodiment in various forms within the scope of the appended claims.

What is claimed is:

1. In a self-service peer to peer system, a method of distributing a software package across a communications network from a management station to a plurality of self-service terminals in which each self-service terminal has a controller unit associated therewith and is connected as an end point node to the communications network, the method comprising the steps of:

(a) transmitting the software package from the management station to a first self-service terminal of the plurality of self-service terminals;

(b) transmitting a transfer command from the management station to the first self-service terminal which has received the software package, the transfer command specifying a second self-service terminal;

(c) then transmitting the software package from the first self-service terminal to the second self-service terminal of the plurality of self-service terminals;

(d) transmitting the software package from the management station to a third self-service terminal of the plurality of self-service terminals while the first self-service terminal is transmitting the software package to the second self-service terminal;

(e) maintaining at the management station a list of the plurality of self-service terminals together with an indication of whether or not the software package is received;

(f) transmitting to the management station a transfer complete message from the first self-service terminal which has completed transmission of the software package to the second self-service terminal; and (g) updating the list of the plurality of self-service terminals when the management station receives the transfer complete message of step (f);

wherein the management station may transmit concurrently to more than one of the plurality of self-service terminals said software package and/or said transfer command.

* * * * *